(12) United States Patent
Snider

(10) Patent No.: US 6,854,251 B2
(45) Date of Patent: Feb. 15, 2005

(54) WINDROW FORMING SYSTEM FOR A CROP HARVESTING HEADER

(75) Inventor: Geoffrey U. Snider, Winnipeg (CA)

(73) Assignee: MacDon Industries Ltd., Manitoba (CA)

(*) Notice: Subject to any disclaimer, the term of this patent is extended or adjusted under 35 U.S.C. 154(b) by 0 days.

(21) Appl. No.: 10/429,961

(22) Filed: May 6, 2003

(65) Prior Publication Data

US 2004/0221562 A1 Nov. 11, 2004

(51) Int. Cl.$^7$ .......... A01D 43/00; A01D 57/26; A01D 57/28; A01D 57/30
(52) U.S. Cl. ......... 56/192
(58) Field of Search .......... 56/16.4 A, 192, 56/16.4 B, DIG. 7, DIG. 21, 16.6, 16.8, 202, 203, 206, DIG. 5

(56) References Cited

U.S. PATENT DOCUMENTS

| | | | | |
|---|---|---|---|---|
| 2,915,869 A | * | 12/1959 | Coultas | 56/1 |
| 3,241,300 A | * | 3/1966 | Fell et al. | 56/153 |
| 3,680,290 A | * | 8/1972 | Laverne | 56/1 |
| 3,721,073 A | * | 3/1973 | Scarnato et al. | 56/16.4 B |
| 3,881,301 A | * | 5/1975 | Sawyer et al. | 56/14.4 |
| 4,099,364 A | * | 7/1978 | Kanengieter et al. | 56/16.4 A |
| 4,175,366 A | * | 11/1979 | Cicci | 56/15.8 |
| 4,217,746 A | * | 8/1980 | Cicci et al. | 56/14.7 |
| 4,858,419 A | | 8/1989 | Bernier | |
| 5,930,988 A | * | 8/1999 | Hanson | 56/16.4 A |
| 5,943,848 A | * | 8/1999 | Rice et al. | 56/16.4 B |

\* cited by examiner

*Primary Examiner*—Árpad Fabian Kovacs
(74) *Attorney, Agent, or Firm*—Adrian D. Battison; Michael R. Williams; Ryan W. Dupuis

(57) ABSTRACT

A windrow is formed by discharging the crop rearwardly from a crop conditioner, engaging a center part of the web with a center deflector panel which is adjustable in width so as to direct that portion of the web, selected to match the intended width of the windrow, in contact with the center deflector panel downwardly toward the ground leaving two side portions which are not deflected and thus move to a height above the center portion, and engaging each of the side portions with a side deflector panel so that the side portion is redirected from a position at one side of the center portion and above the center portion to a position on top of the center portion.

18 Claims, 2 Drawing Sheets

WINDROW FORMING SYSTEM FOR A CROP HARVESTING HEADER

This invention relates to a windrow forming system for crop emerging from the conditioner of a crop harvesting header.

BACKGROUND OF THE INVENTION

The term "header" as used commonly and as used in this specification is intended to include both headers carried on self propelled machines, which may therefore not include wheels mounted on the header itself, and headers which are towed behind a tractor and thus may include wheels attached to the header frame or to a component supporting the header.

Forage harvesting machines that condition forage and then deposit the forage into a windrow for drydown and subsequent harvesting are commonly used. Various types of forming baffles, fins, and shields are used to process the forage as it is ejected from the conditioner so that the windrow width, shape, uniformity and density are controlled.

A variety of preferences on width and height are common are used depending on operator preferences. These depend on climate factors such as wind, sun, precipitation, morning dew and other preferences such minimizing solar bleaching and also depend on the subsequent methods used to harvest the forage.

Fast drying in general is very important since getting the forage harvested quickly from the field by baling the windrow reduces the amount of degradation of quality from sun and morning dews and the risk of rapid degradation that occurs from precipitation and accelerated decomposition.

In practice wide conditioners are desirable and have become widely accepted as these give superior capacity and improved conditioning to the crop. Thus, most of the machines on the market feature conditioners that are wider than the resultant windrows commonly formed. A common problem therefore, is that of controlling and guiding the web of crop material issuing from the conditioner and controlling this to reduce in width to form the narrower the windrow which is required.

Many designs thus include side guide panels which engage side portions of the web of crop material with the intention of moving that portion of the crop at the side edges inwardly. In many cases, conventional designs have the disadvantage of the formation of concentrated crop streams as the edges of the flow are deflected inward to form a windrow narrower than the conditioner. Such concentrated crop streams interfere with the requirement for uniformity or constant density and thus will increase drying time.

A number of arrangements also use center deflector panels which engage the web or stream of crop material from above and thus direct the crop material downwardly in a more concentrated stream.

One example of a crop deflector plate is shown in U.S. Pat. No. 4,858,419 issued Aug. $22^{nd}$ 1989 to Paul Bernier which discloses a top panel resting on fluffy crops such as flax to compress this into the stubble. This is not however used in conjunction with a crop conditioner.

Where such deflector plates are used, they generally have a fixed width equal to the full width of the web issuing from the conditioner and the job of concentrating the web to reduce its width is effected wholly by the side plates.

SUMMARY OF THE INVENTION

According to the invention therefore there is provided a crop harvesting header comprising:

a frame;

a crop cutting assembly mounted across a front of the frame for cutting a crop as the header frame is moved across the ground;

an elongate crop conditioner assembly arranged transversely across the frame and arranged for receiving the cut crop from the cutting assembly and for discharging the crop rearwardly from a rear of the crop conditioner assembly as a web having a width across the width of the crop conditioner assembly;

and a windrow forming system for receiving the web from the crop conditioner assembly and for guiding the web to form a windrow on the ground, the system comprising;

a center deflector panel mounted at a position relative to the frame located above the web and arranged so as to be inclined downwardly and rearwardly into contact with an upper surface of the web so as to direct that portion of the web in contact with the center deflector panel downwardly toward the ground;

the center deflector panel being adjustable in width across the web so as to increase and decrease a width of the panel arranged to contact the upper surface of the web;

the center deflector panel being adjustable in width to a width less than the width of the web so as to engage a center portion of the web and to direct that center portion downwardly toward the ground leaving two side portions which are not deflected and thus move to a height above the center portion;

and two side deflector panels each mounted at a position relative to the frame located to the side of the web and extending generally at an angle across a respective one of the side portions so that the side portion is redirected from a position at one side of the center portion and above the center portion to a position on top of the center portion.

The term panel is not intended to limit the invention as defined above to a complete impervious sheet since the panel may be perforated, may be manufactured from various materials or may include additional elements provided it is shaped and arranged to effect the deflection of the web as set forth above.

The panel does not need to be planar and it may be shaped or curved with curved leading or trailing edges without affecting the function set forth above.

Similarly each side panel may and preferably does include a side portion and a bottom portion arranged at an angle relative to the side portion to contact and guide the crop material.

Preferably the center panel includes a generally planar panel body with a generally horizontal trailing rear edge which engages and depresses the web.

Preferably the center panel is mounted at a fixed angle inclined downwardly but is mounted for adjustment pivotal movement about a horizontal transverse axis above the web.

Preferably there are provided fixed end pieces which are arranged to engage the outer side edges of the web and to direct the side edges inwardly and wherein the center panel has side edges which are shaped to cooperate with the fixed end pieces when the center panel is adjusted to its widest width.

Preferably each side panel is mounted for adjustment pivotal movement about a generally upright axis at one end of the conditioner assembly.

Preferably each side panel includes a lead section of the bottom wall which is inclined forwardly and downwardly and arranged to engage an edge of the center portion for consolidating the edge.

Preferably the side wall of each side panel has a bottom edge which is inclined rearwardly and upwardly and the bottom wall is attached to the bottom edge.

Preferably the side wall of each side panel has an inwardly inclined top restraining wall.

According to a second aspect of the invention there is provided a method of forming a windrow from a cut crop comprising:

discharging the crop rearwardly from a rear of a crop conditioner assembly as a web having a width across the width of the crop conditioner assembly;

engaging a center part of the web with a center deflector panel mounted at a position relative to the header frame located above the web and arranged so as to be inclined downwardly and rearwardly into contact with an upper surface of the web so as to direct that portion of the web in contact with the center deflector panel downwardly toward the ground;

arranging the center part of the web to be substantially equal to the width of the windrow;

arranging the center panel to cause a center portion of the web to be directed downwardly toward the ground leaving two side portions which are not deflected and thus move to a height above the center portion;

and engaging each of the side portions with a respective one of two side deflector panels each mounted at a position relative to the header frame located to the side of the web and extending generally at an angle across a respective one of the side portions so that the side portion is redirected from a position at one side of the center portion and above the center portion to a position on top of the center portion.

The arrangement thus consists of a central deflector panel mounted directly behind the conditioner roll and two side deflectors mounted rearward of this central deflector.

The central deflector is mounted on a pivot point that is above the crop discharge as it exits the conditioner rolls. The rear portion of the deflector panel can be lowered into the crop flow thereby directing it down to the ground.

The side deflectors are mounted on pivots near either end of the conditioner roll. These can be adjusted into the crop flow directing the crop generally inward.

This deflector length of the central panel relative to the roll length is thus adjustable. The preferred arrangement has the central deflector is in sections that slide relative to each other. This allows the length to be adjusted to lay down as much of the forage flow as desired. In practice the operator would set the deflector length approximately equal to the width of windrow desired. Then the central portion of crop flow would be laid down on the ground in a primary layer. In practice if crop is fed into the conditioner is even, then the this layer should be quite uniform.

The forage that flows beyond each of the deflector ends is dealt with separately by the side deflectors. This crop contacts the side deflectors that are positioned to spread it on top of the primary layer of forage that has already been laid down by the central deflector. In the preferred arrangement these side deflectors are shaped and the angle set to slow the crop flow allowing it to drop gently so that a low density windrow is formed.

The adjustment can be carried out simply by unbolting and sliding the sheets each relative to the next. However a more user-friendly system can use a crank and slide guide system which provides the adjustment more quickly and without the necessity for the user accessing the area underneath the header.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
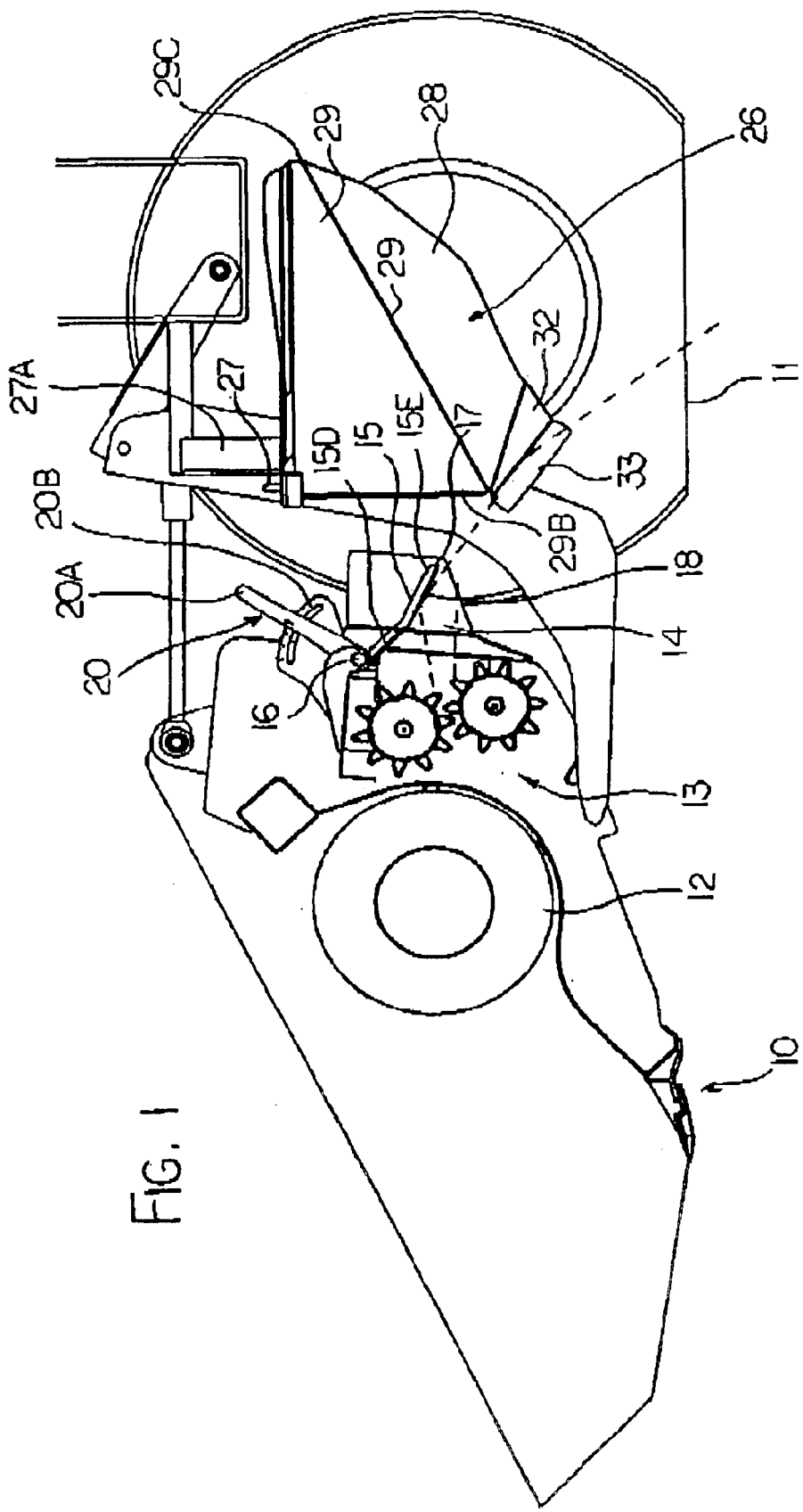
FIG. 1 is a schematic side elevational view of a crop harvesting header according to the present invention.

A header shown schematically in FIG. 1 includes a cutter bar 10 of a conventional construction which cuts crop from ground 11 in advance of the cutter bar and discharges that crop onto a crop convergence or conveying system generally indicated at 12 which feeds the crop to a conditioning assembly generally indicated at 13.

The cutter bar can be of many different types including sickle knives, rotary cutters and others depending upon crop requirements, as well known to one skilled in the art. The convergence system 12 can be also be of various different types including drapers, augers, guide surfaces and the like which simply act to converge the crop or carry the crop to the conditioner assembly 13.

The conditioner assembly 13 can also be of various different types including fluted rollers, pressure rollers, flail rollers and others, again depending upon crop type and condition.

In the conditioner assembly, the crop is generally compressed to form a web which emerges from the conditioner as indicated at 14 in a stream which tends to expand in thickness as the crop emerges from the compression of the conditioner system.

The conditioner system 13 is generally of maximum width which can be accommodated within the header frame and related components so as to provide maximum conditioning action and header capacity.

In the example shown the conditioner is formed by a pair of rollers which include flutes which intermesh to effect the conditioning action. The bottom roller is located closely adjacent the ground level 11. In many cases the bottom roller is mounted so that its axis is slightly rearward of the axis of the top roller so that the material tends to exit the nip between the rollers in a direction at right angles to a plane joining the axes so that the direction is slightly above horizontal.

The arrangement according to the present invention provides a center deflection panel 15 which is mounted on a horizontal pivot 16 at its edge. The panel 15 is generally rectangular with the pivot 16 at its leading edge with a trailing edge 17 parallel to the horizontal pivot 16. The panel thus defines a bottom surface 18 for engaging the crop 14 exiting the nip of the conditioner rollers.

A mounting 20 comprising an arm 20A and a locating slot 20B is arranged to hold the panel 15 in fixed position about the pivot 16 so that it remains at a constant angle relative to the crop material and to the plane at right angles to the plane containing the axis of the rollers along which the crop nominally exits. However the angle of the panel relative to the exit plane can be adjusted by actuating adjustment of the mounting elements 20A and 20B of the mounting support 20 of the panel.

The panel 15 is formed from 3 panel portions 15A, 15B and 15C. The center panel portion 15B is fixed on the support 16. The side panel portions 15A and 15C can slide along the mounting 20 so as to increase and decrease the width of the panel between its side edges 21 and 22. The operating part of the panel 15 is generally planar as indicated at 15E but is connected to an upper support part 15D above the operating part at a bend.

In practice the width of the panel is adjusted by suitable mechanism in order that the width of the panel is substantially equal to the intended width of the resultant windrow. The angle is then adjusted so that the under surface of the panel engages the crop as it exits from the conditioner rollers thus deflecting the crop downwardly toward the ground. The width of the center deflection panel is arranged to be thus less than the full width of the web of crop material issuing from the conditioner so that it engages only a center portion thereof, deflecting that center portion downwardly. This leaves two side portions which are not so deflected and thus continue in the original exit direction which tends to be slightly upwardly and rearwardly thus in effect separating the two side portions from the center portion. Thus the two side portions continue in their undeflected path which is in effect an arc extending upwardly and rearwardly from the conditioner rollers and then curving downwardly.

In addition to the center deflector panel there are provided two side deflector panels 25 and 26 each on a respective side of a center panel and downstream therefrom. Each of the side deflector panels is mounted on a vertical pivot 27 on a bracket 27A attached to the frame so that its angle of orientation inwardly and rearwardly can be adjusted about the pivot 27. The pivot 27 is attached to a frame member 27B which extends along the rear of the panel and provides support for it.

Each side panel comprises a bottom wall 28 and a side wall 29 which are arranged at an angle relative to one another to form in effect a chute which receives the side portions of the web of crop material which are undeflected by the center panel and guides those side portions inwardly and rearwardly by impact of those side portions with the surfaces of the side deflectors.

The side wall 29 stands vertically upwardly and has a bottom edge 29A which is inclined upwardly and rearwardly from a vertical front edge 29B. The bottom wall is attached to the bottom edge so that its inner edge is inclined at the same angle. The wall 28 is inclined from the edge 29A downwardly and inwardly at an angle to the side wall 28 at an angle of the order of 145 degrees.

At a front edge of the bottom wall 28 is provided a forwardly and downwardly inclined portion 32 which is triangular in shape and defines a front lip 33 along its front edge. This is arranged so that the side edge of the center portion of the web engages the portion 32 to act to consolidate the edge only of the center portion.

The side deflectors are located so that the side wall 29 thereof extends across the path of the side portions of the web. The bottom walls of the side deflectors are arranged so that the arc of movement of the side portions drops the material onto those bottom surfaces so that the material is caused to slide across the bottom surfaces into impact with the side walls to cause the material to be moved across the direction of the material so as to be carried onto the top of the center portion and spread across the top of the center portion.

It will be appreciated that the crop material is in many cases discharged from the conditioner at a speed of the order of 15–25 mph which is significantly higher than the forward speed of the vehicle. This relatively high speed and movement of the side portions of the web which are undeflected and not yet engaged with the ground causes them to resiliently rebound from the side walls of the side deflectors causing the chute-like shape of the side deflectors to redirect the material from the side portions in a direction across the center portion to spread the material across the center portion.

Depending upon the width of the center portion which can be from 40 inches to full conditioner width, depending upon the requirements for the windrow, each side portion can be spread so that it extends substantially wholly across one half of the center portion or can be spread closer to the side edges of the center portion if the center portion is of the wider widths in the range set forth above.

As well as redirecting the side portions inwardly over the center portion, the side panels also spread the width of the side portions. Thus the side portions can be spread over a larger width of the center portion than their initial width. This is achieved by the shape of the panel which redirects the material off the side wall 29 and discharges it over the inner edge 28A of the bottom wall. (The inner edge 28A includes a main part 28B from the portion 32 extending generally parallel to the side wall, a middle part 28C which turns rearward and a rear part which turns again toward the trailing edge 29C of the side wall. This shape tends to carry the side portion over the center portion and to spread it over up to one half of the width of the center portion. Material discharges over edges 28A, 28B, 28C, 28D, and 29C.

Figure 2:
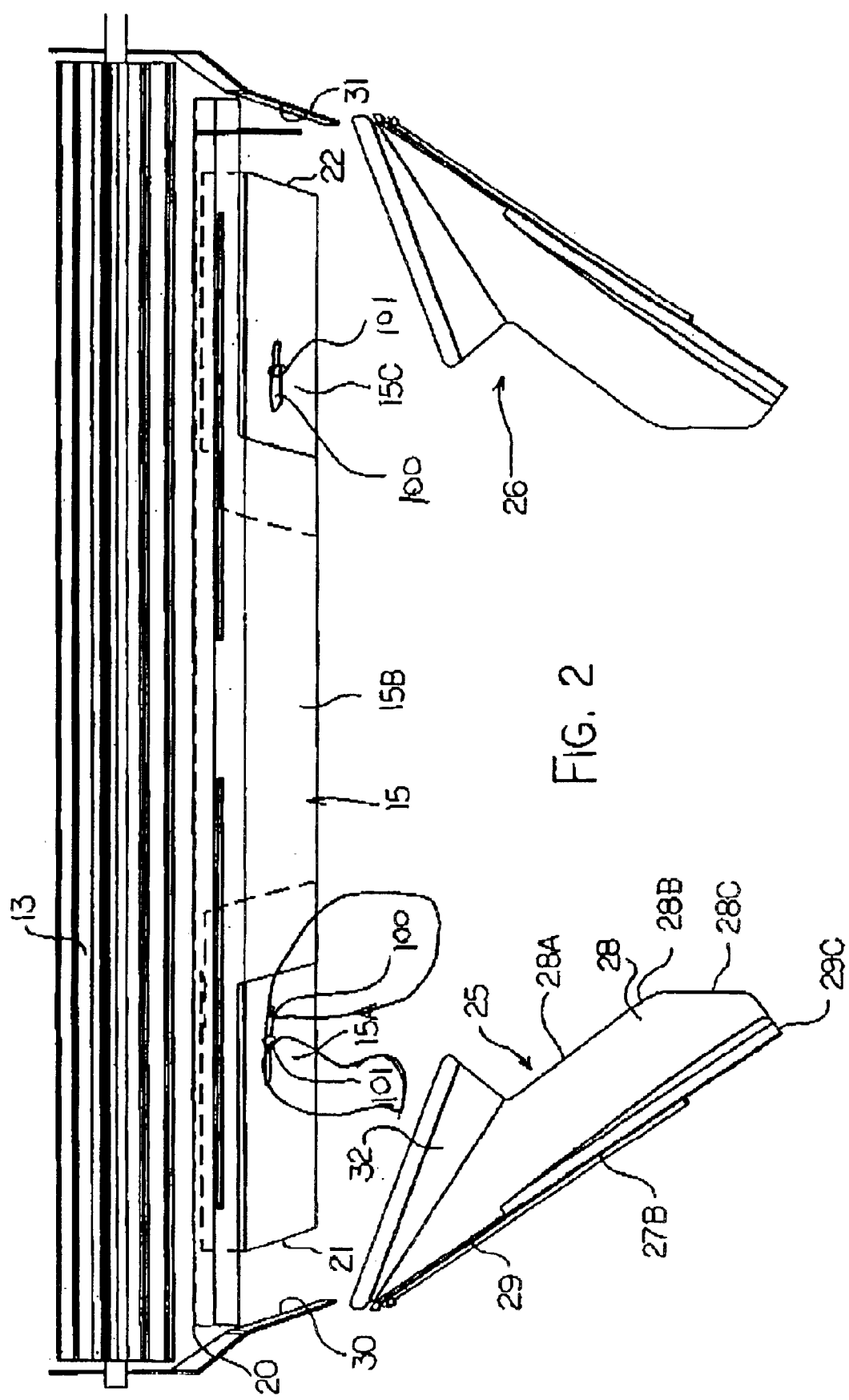
FIG. 2 is a top plan view of the crop guiding panels and crop conditioner of the header of FIG. 1.

The center panel can be adjusted as shown in FIG. 2 by an adjustment mechanism simply defined by slots 100 in the panel portions 15A and 15C and by clamping the panel portions 15A 15B and 15C together by bolts 101 passing through the slots 100. Alternatively a cranking mechanism can be used together with an operating slide which pushes the side panels inwardly or outwardly, for example using a screw, using a chain where one side piece Is attached to one run and the other to the other run, a rack and pinion or hydraulic cylinders.

At the sides of the conditioner are provided a pair of guides 30 and 31 which are provided simply to move the extreme outside edge portions of the web of crop material inwardly slightly to consolidate the edges of the crop and bring the material inside frame elements of the header. The sides 21 and 22 of the panel are preferably shaped so that they are inclined so as to match the incline of the side deflectors 30 and 31.

The arrangement described herein in many cases may provide the following advantages:

It allows low density windrows of superior uniformity to be formed in a variety of widths.

It gives greater control over windrow formation to the operator.

It provides superior spreading of crop exiting near the ends of the conditioner rolls while forming windrows narrower than conditioner roll length.

It substantially reduces occurrence of concentrated crop streams commonly formed by conventional systems.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A crop harvesting header comprising:
   a frame;
   a crop cutting assembly mounted across a front of the header frame for cutting a crop as the header frame is moved across the ground;
   an elongate crop conditioner assembly arranged transversely across the frame and arranged for receiving the cut crop from the cutting assembly and for discharging the crop rearwardly from a rear of the crop conditioner assembly as a web having a width across the width of the crop conditioner assembly;

and a windrow forming system for receiving the web from the crop conditioner assembly and for guiding the web to form a windrow on the ground, the system comprising;

a center deflector panel mounted at a position relative to the frame located above the web and arranged so as to be inclined downwardly and rearwardly into contact with an upper surface of the web so as to direct that portion of the web in contact with the center deflector panel downwardly toward the ground;

the center deflector panel having two side edges defining a width of panel therebetween;

the center deflector panel being adjustable in width across the web so as to increase and decrease the width of the panel between the side edges which is arranged to contact the upper surface of the web;

the center deflector panel being adjustable in width between the side edges to a width less than the width of the web so as to engage a center portion of the web and to direct that center portion downwardly toward the ground leaving two side portions which are not deflected and thus move to a height above the center portion;

and two side deflector panels each mounted at a position relative to the header frame located to the side of the web and extending generally at an angle across a respective one of the side portions so that the center portion remains substantially without redirection by the side deflector panels and such that the side portion is redirected from a position at one side of the center portion and above the center portion to a position on top of the center portion.

2. The header according to claim 1 wherein the center panel includes a generally planar panel body with a generally horizontal trailing rear edge which engages and depresses the web.

3. The header according to claim 1 wherein the center panel is mounted for adjustment pivotal movement about a horizontal transverse axis above the web.

4. The header according to claim 1 wherein there are provided fixed end pieces which are arranged to engage the outer side edges of the web and to direct the side edges inwardly and wherein the center panel has side edges which are shaped to engage the fixed end pieces.

5. The header according to claim 1 wherein each side panel includes a bottom wall onto which the aide portion is deposited and a side wall for confining and guiding an edge of the side portion.

6. The header according to claim 5 wherein each side panel includes a lead section of the bottom wall which is inclined forwardly and downwardly and arranged to engage an edge of the center portion for consolidating the edge.

7. The header according to claim 5 wherein the side wall of each side panel has a bottom edge which is inclined rearwardly and upwardly and the bottom wall is attached to the bottom edge.

8. The header according to claim 5 wherein the side wall of each side panel has an inwardly inclined top restraining wall.

9. The header according to claim 1 wherein each side panel is mounted for adjustment pivotal movement about a generally upright axis at one end of the conditioner assembly.

10. A method of forming a windrow from a cut crop to a required windrow width comprising:

discharging the crop rearwardly from a rear of a crop conditioner assembly as a web having a width across the width of the crop conditioner assembly wider than the required windrow width;

engaging a center portion of the web, which center portion is narrower than the web width, with a center deflector panel mounted at a position relative to the header frame located above the web and arranged so as to be inclined downwardly and rearwardly into contact with an upper surface of the web so as to direct that center portion of the web in contact with the center deflector panel downwardly toward the ground;

arranging the center deflector panel and therefore the center portion of the web to be substantially equal to the required width of the windrow and thus narrower than the web width;

arranging the center panel to cause the center portion of the web to be directed downwardly toward the ground leaving two side portions of the web which are not contacted by the center deflector panel and thus not deflected so that the side portions move to a height above the center portion;

and, while the side portions are moving at the height above the center portion, engaging each of the side portions with a respective one of two side deflector panels;

each side deflector panel being mounted at a position located to the side of the center portion of the web and extending generally at an angle across a respective one of the side portions;

and causing each side deflector panel to redirect the respective side portion from a position at one side of the center portion and at a height above the center portion inwardly from the side to be deposited in a position on top of the center portion.

11. The method according to claim 10 wherein the center panel includes a generally planar panel body with a generally horizontal trailing rear edge which engages and depresses the web.

12. The method according to claim 10 wherein the center panel is mounted for adjustment pivotal movement about a horizontal transverse axis above the web.

13. The method according to claim 10 wherein there are provided, fixed end pieces which are arranged to engage the outer side edges of the web and to direct the side edges inwardly and wherein the center panel has side edges which are shaped to engage the fixed end pieces.

14. The method according to claim 10 wherein each side panel includes a bottom wall onto which the side portion is deposited and a side wall for confining and guiding an edge of the side portion.

15. The method according to claim 10 each side panel is mounted for adjustment pivotal movement about a generally upright axis at one end of the conditioner assembly.

16. The method according to claim 14 wherein each side panel includes a lead section of the bottom well which is inclined forwardly and downwardly and engages an edge of the center portion for consolidating the edge.

17. The method according to claim 14 wherein the side wall of each side panel has a bottom edge which is inclined rearwardly and upwardly and the bottom wall is attached to the bottom edge.

18. The method according to claim 14 wherein the side wall of each side panel has an inwardly inclined top restraining wall.

* * * * *